(12) United States Patent
Huang et al.

(10) Patent No.: US 11,397,489 B2
(45) Date of Patent: Jul. 26, 2022

(54) TOUCH DISPLAY PANEL, TOUCH DISPLAY DEVICE, AND TOUCH DETECTION METHOD

(71) Applicant: Shanghai AVIC OPTO Electronics Co., Ltd., Shanghai (CN)

(72) Inventors: Chunyang Huang, Shenzhen (CN); Yong Fan, Shenzhen (CN); Jiacheng Zhong, Shenzhen (CN); Yu Huang, Shenzhen (CN); Songlin Feng, Shenzhen (CN)

(73) Assignee: Shanghai AVIC OPTO Electronics Co., Ltd., Shanghai (CN)

( * ) Notice: Subject to any disclaimer, the term of this patent is extended or adjusted under 35 U.S.C. 154(b) by 0 days.

(21) Appl. No.: 16/713,610

(22) Filed: Dec. 13, 2019

(65) Prior Publication Data

US 2021/0064212 A1  Mar. 4, 2021

(30) Foreign Application Priority Data

Aug. 30, 2019  (CN) .......................... 201910811189.5

(51) Int. Cl.
*G06F 3/041* (2006.01)
*G06F 3/044* (2006.01)

(52) U.S. Cl.
CPC ........ *G06F 3/04166* (2019.05); *G06F 3/0443* (2019.05); *G06F 3/0446* (2019.05);
(Continued)

(58) Field of Classification Search
CPC .. G06F 3/04166; G06F 3/0443; G06F 3/0448; G06F 3/0412; G06F 3/044; G06F 3/04186; G06F 3/0446
(Continued)

(56) References Cited

U.S. PATENT DOCUMENTS

2013/0181943 A1*  7/2013  Bulea .................. G06F 3/04164
                                                  345/174
2014/0001024 A1*  1/2014  Liao ....................... G06F 3/044
                                                  200/600
(Continued)

FOREIGN PATENT DOCUMENTS

CN        105975140 A    9/2016
CN        106855762 A    6/2017
(Continued)

*Primary Examiner* — Jimmy H Nguyen
(74) *Attorney, Agent, or Firm* — Anova Law Group, PLLC

(57) ABSTRACT

The present disclosure provides a touch display panel, a touch display device, and a touch detection method. The touch display panel includes a base substrate, touch driving electrodes, insulated from each other and arranged in an array on the base substrate, and touch sensing electrodes, insulated from each other and surrounding each of the touch driving electrodes, that the touch driving electrodes are disposed in a same layer as the touch sensing electrodes; and an integrated circuit, that the touch driving electrodes and the touch sensing electrodes are electrically connected to the integrated circuit, the integrated circuit sends touch driving signals to the touch driving electrodes to perform a touch scan, and the integrated circuit receives sensing signal change quantities of the touch sensing electrodes surrounding a same one of the touch driving electrodes, to determine a touch position.

13 Claims, 10 Drawing Sheets

(52) U.S. Cl.
CPC ......... *G06F 3/0448* (2019.05); *G06F 3/0412* (2013.01); *G06F 3/04186* (2019.05); *G06F 2203/04101* (2013.01)

(58) Field of Classification Search
USPC ........................................... 345/174
See application file for complete search history.

(56) References Cited

U.S. PATENT DOCUMENTS

| | | | |
|---|---|---|---|
| 2014/0340596 A1* | 11/2014 | Kim | G06F 3/044 349/12 |
| 2015/0062054 A1* | 3/2015 | Yun | G06F 3/044 345/174 |
| 2015/0116254 A1* | 4/2015 | Solven | G06F 3/0412 345/174 |
| 2015/0185903 A1* | 7/2015 | Park | G06F 3/0446 345/173 |
| 2015/0317025 A1* | 11/2015 | Pai | G06F 3/044 345/173 |
| 2016/0026294 A1* | 1/2016 | Tang | G06F 3/044 345/174 |
| 2016/0313852 A1* | 10/2016 | Dorfner | G06F 3/0443 |
| 2019/0235678 A1* | 8/2019 | Kim | G06F 3/0418 |
| 2019/0286281 A1* | 9/2019 | Aoki | G06F 3/041 |

FOREIGN PATENT DOCUMENTS

| | | | |
|---|---|---|---|
| CN | 108628485 A | 10/2018 | |
| WO | WO-2018110533 A1 * | 6/2018 | ............ G06F 3/047 |

\* cited by examiner

TOUCH DISPLAY PANEL, TOUCH DISPLAY DEVICE, AND TOUCH DETECTION METHOD

CROSS-REFERENCES TO RELATED APPLICATIONS

This application claims the priority of Chinese Patent Application No. CN201910811189.5, filed on Aug. 30, 2019, the entire contents of all of which are incorporated herein by reference.

FIELD OF THE DISCLOSURE

The present disclosure generally relates to the field of display technologies and, in particular, relates to a touch display panel, a touch display device, and a touch detection method.

BACKGROUND

With continuous development of touch technologies, touch screens have become an important medium for electronic devices to interact with users.

Some touch screens can be controlled by a touch screen operator distanced from a screen surface. Such touch screens are also referred to as three-dimensional (3D) touch screens, or stereo touch screens. There are a variety of ways to implement their operations, for example, through a pressure sensing technology or through transmission characteristics of a magnetic field, an electric field, an infrared ray, or an ultrasound.

In an existing three-dimensional touch technology, a touch panel is added to a display panel by an electric field technology to realize gesture operation functions in horizontal, vertical, and circular directions. However, an existing electric field type three-dimensional touch technology adopts a design in which a driving electrode is in the middle and sensing electrodes are around. This design is only suitable for a three-dimensional touch scheme of a small-sized (less than 7-inch) display panel. For a medium or large-sized display panel with a driving electrode in the middle, signal amplitude of the surrounding sensing electrodes is weak, thereby resulting in insensitive touch, low touch accuracy, and inability to use a 3D touch, affecting 3D touch experience. The existing design is not suitable for large-sized display panels.

BRIEF SUMMARY OF THE DISCLOSURE

One aspect of the present disclosure provides a touch display panel, including: a base substrate; n touch driving electrodes, insulated from each other and arranged in an array on the base substrate; a plurality of touch sensing electrodes, insulated from each other and surrounding each of the n touch driving electrodes, that the n touch driving electrodes are disposed in a same layer as the plurality of touch sensing electrodes; and an integrated circuit, that the n touch driving electrodes and the plurality of touch sensing electrodes are electrically connected to the integrated circuit, the integrated circuit sends touch driving signals to the n touch driving electrodes to perform a touch scan, and the integrated circuit receives sensing signal change quantities of the plurality of touch sensing electrodes surrounding a same one of the n touch driving electrodes, to determine a touch position.

Another aspect of the present disclosure provides a touch display device, including the touch display panel provided by the present disclosure.

Another aspect of the present disclosure provides a touch detection method for a touch display panel, that the touch display panel, includes n touch driving electrodes, insulated from each other and arranged in an array on a base substrate; a plurality of touch sensing electrodes, insulated from each other and surrounding each of the n touch driving electrodes, the n touch driving electrodes being disposed in a same layer as the plurality of touch sensing electrodes; and an integrated circuit, the n touch driving electrodes and the plurality of touch sensing electrodes being electrically connected to the integrated circuit. The touch detection method includes a working time of the touch display panel being within one frame period, the integrated circuit sending touch driving signals to the n touch driving electrodes to perform a touch scan, and the integrated circuit receiving sensing signal change quantities of the plurality of touch sensing electrodes surrounding a same one of the n touch driving electrodes, and determining a touch position.

Other aspects of the present disclosure can be understood by those skilled in the art in light of the description, the claims, and the drawings of the present disclosure. Further features of the present disclosure and its advantages will become apparent from the following detailed description of exemplary embodiments.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Various exemplary embodiments of the present disclosure are described in detail with reference to the drawings. The relative arrangement of the components and steps, numerical expressions, and numerical values set forth in the exemplary embodiments are not intended to limit the scope of the present disclosure unless otherwise specified.

The following description of at least one exemplary embodiment is merely illustrative, and never in any way limits the present disclosure and its application or use.

Techniques, methods, and apparatus known to those skilled in the art may not be discussed in detail, but the techniques, the methods, and the apparatus should be considered as part of the present disclosure, where appropriate.

In all of the examples shown and discussed herein, any specific values are to be construed as illustrative only and not as a limitation. Thus, other examples of the exemplary embodiments may have different values.

Figure 1:
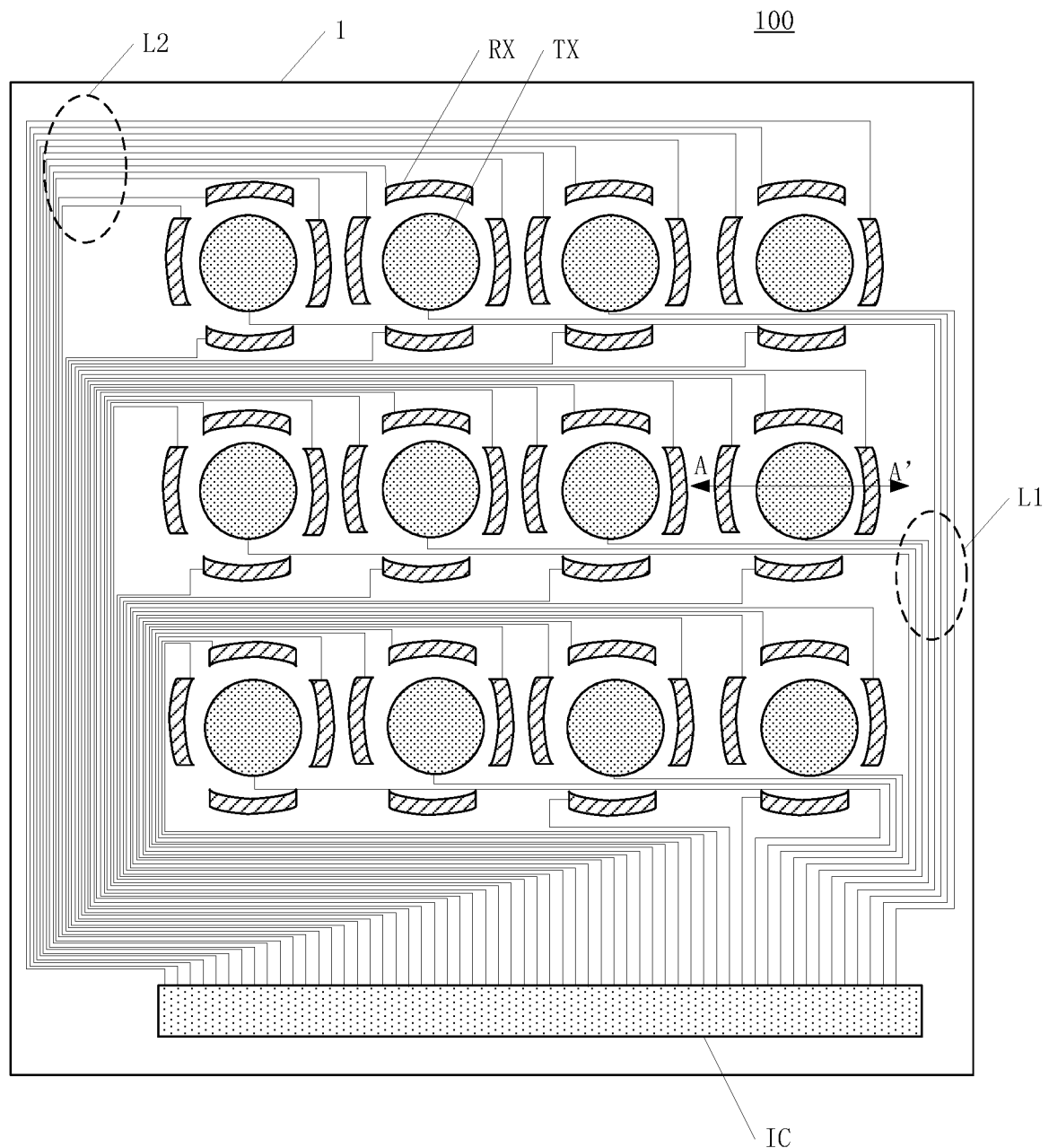
FIG. 1 is a schematic diagram of a planar structure of an exemplary touch display panel according to various embodiments of the present disclosure.

Similar reference numerals and letters indicate similar items in the following drawings, and therefore, once an item is defined in one drawing, it is not required to be further discussed in the subsequent drawings FIG. 1 is a schematic diagram of a planar structure of an exemplary touch display panel according to various embodiments of the present disclosure. A touch display panel 100 in FIG. 1 includes a base substrate 1, n touch driving electrodes TX arranged in an array on the base substrate 1, and a plurality of touch sensing electrodes RX surrounding each of the n touch driving electrodes TX. The n touch driving electrodes TX are disposed in a same layer as the plurality of touch sensing electrodes RX, the plurality of touch sensing electrodes RX is insulated from each other, and the n touch driving electrodes TX are insulated from each other.

The touch display panel further includes an integrated circuit IC, and the n touch driving electrodes TX and the plurality of touch sensing electrodes are electrically connected to the integrated circuit.

The integrated circuit IC sends touch driving signals to the n touch driving electrodes TX to perform a touch scan, and the integrated circuit IC receives sensing signal change quantities of the plurality of touch sensing electrodes RX surrounding a same one of the n touch driving electrodes TX, to determine a touch position.

The n touch driving electrodes TX are electrically connected to the integrated circuit IC through first signal lines L1, and the plurality of touch sensing electrodes RX is electrically connected to the integrated circuit IC through second signal lines L2. As shown in FIG. 1, the second signal lines L2 are connected to pins (not shown) on the integrated circuit IC, after being routed from a left frame of the touch display panel 100. The first signal lines L1 are connected to pins (not shown) on the integrated circuit IC, after being routed from a right frame of the touch display panel 100. The first signal lines L1 may also be connected to the pins on the integrated circuit IC after being routed from the left frame of the touch display panel 100, and the second signal lines L2 may be connected to the pins on the integrated circuit IC after being routed from the right frame of the display panel 100, which is not specifically limited herein. FIG. 1 shows only a case where the integrated circuit IC is placed on the base substrate 1. The integrated circuit IC may also be disposed on a flexible circuit board, and the flexible circuit board is bonded to the base substrate 1 through pads, which is not specifically limited herein.

Furthermore, the plurality of touch sensing electrodes RX is insulated from each other, and the touch position may be determined by sensing signal change quantities of different touch sensing electrodes RX. The touch position here is three-dimensional coordinates, and includes coordinates of a first direction, a second direction, and a third direction, that the first direction is optionally perpendicular to a data line direction, the second direction is parallel to the data line direction, and the third direction is perpendicular to the first direction and the second direction, respectively.

Figure 2:
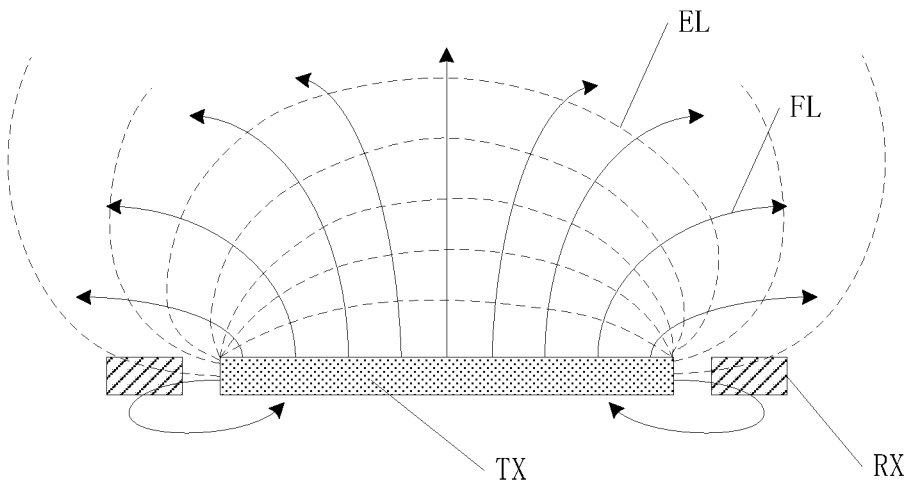
FIG. 2 and FIG. 3 are schematic diagrams showing a working principle of an electric near field of a three-dimensional touch according to various embodiments of the present disclosure.
Figure 3:
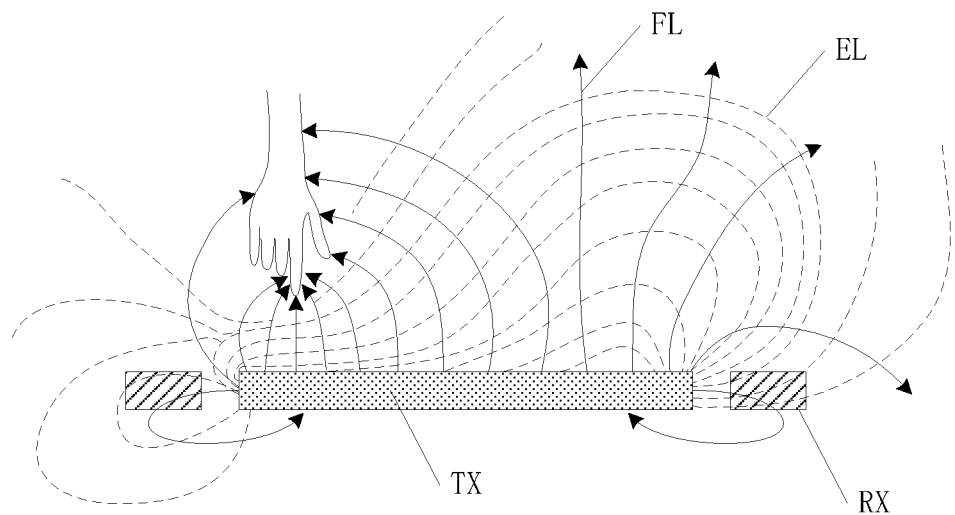

Referring to FIG. 2 and FIG. 3, FIG. 2 and FIG. 3 are schematic diagrams showing a working principle of an electric near field of a three-dimensional touch according to various embodiments of the present disclosure. The working principle of the three-dimensional touch of the present disclosure is electric near-field sensing. A position and motion of a touch are determined by the electric near-field sensing. The integrated circuit IC sends the touch driving signals to the n touch driving electrodes TX. The touch driving signals are square wave signals with a certain frequency, and a three-dimensional electric field is formed on a surface of the touch display panel. When a finger is not close to the touch display panel, the three-dimensional electric field is stable, and equipotential lines EL are not distorted, as shown in FIG. 2. When a finger approaches the touch display panel, for example, within a range of about 10 cm to about 15 cm from the touch display panel, electric field lines FL are attracted to a hand, a part of a current is transmitted to an earth due to a conductivity of a human body, the three-dimensional electric field is locally reduced, and the equipotential lines EL are distorted, as shown in FIG. 3. At this time, electric field changes at different positions, that is, sensing signal change quantities, are sensed by the plurality of touch sensing electrodes RX around the n touch driving electrodes TX, and the integrated circuit IC receives the sensing signal change quantities, determines an origin of a distortion of the electric field equipotential lines EL, and determines three-dimensional coordinates at the time of the touch.

Optionally, the touch display panel according to various embodiments of the present disclosure includes a display panel portion and a touch structure portion described above. For a liquid crystal display panel, the touch structure portion and the display panel portion have a laminated structure. Alternatively, the liquid crystal display panel includes an array substrate and a color film substrate that are disposed oppositely. When a color film substrate side is a light emitting side during a display, the n touch driving electrodes TX and the plurality of touch sensing electrodes RX are disposed on a side of the color film substrate away from the array substrate. Two disposing methods may be used. One is to form the n touch driving electrodes TX and the plurality of touch sensing electrodes RX directly on a surface of the color film substrate away from the array substrate. The other is to set a base substrate on the side of the color film substrate away from the array substrate, and form the n touch driving electrodes TX and the plurality of touch sensing electrodes RX directly on the base substrate, that the base substrate may be a cover plate. Since the three-dimensional touch structure is closer to the finger, it is easier to sense signal changes, which is advantageous for recognizing the touch position. Optionally, referring to FIG. 4, a base substrate 1 is disposed on a side of a color film substrate 30 away from an array substrate 20, and provided with the n touch driving electrodes TX, and the plurality of touch sensing electrodes RX surrounding each of the n touch driving electrodes TX.

In other optional embodiments, a common electrode layer may be multiplexed as the touch structure portion in the present disclosure. A liquid crystal display panel includes an array substrate and a color film substrate disposed opposite to each other, and a liquid crystal layer sandwiched between the array substrate and the color film substrate. The liquid crystal layer includes liquid crystal molecules, and pixel electrodes and common electrodes are disposed on the array substrate. A voltage difference between the pixel electrodes and the common electrodes forms an electric field to drive deflection of the liquid crystal molecules. When the common electrodes are block-shaped, the common electrodes may be multiplexed into the n touch driving electrodes TX and the plurality of touch sensing electrodes RX. An arrangement manner may be referred to FIG. 1. The plurality of touch sensing electrodes RX in FIG. 1 is smaller than the n touch driving electrodes TX. In this case, a plurality of block-shaped common electrodes may be grouped into a block-shaped common electrode group, and the block-shaped common electrode group is multiplexed into the n touch driving electrodes TX, and block-shaped common electrodes surrounding the block-shaped common electrode group are multiplexed into the plurality of touch driving electrodes RX. Since only about 3.3 V is required for three-dimensional touch driving, the touch driving signals provided by the integrated circuit IC are generally square wave signals, and a driving voltage is applied for a short time, so even if the common electrodes on the array substrate are multiplexed as the touch structure portion, it will not cause polarization of liquid crystal, and thus display effect of the liquid crystal display panel is not affected. On one hand, multiplexing the common electrode layer does not increase the process, and does not increase a thickness of the display panel. On the other hand, there is no need to additionally provide an integrated circuit, and an integrated circuit may be shared with the display panel portion.

The n touch driving electrodes TX and the plurality of touch sensing electrodes RX may be a regular pattern or an irregular pattern. FIG. 1 shows only a case where the n touch driving electrodes TX are circular and the plurality of touch sensing electrodes RX is curved, and the n touch driving electrodes TX and the plurality of touch sensing electrodes RX may be other shapes, which are not specifically limited herein. A number of the plurality of touch sensing electrodes RX is not limited herein, and it may be two, three, four or more, as long as the array of the n touch driving electrodes TX is arranged on the base substrate 1, and the plurality of touch sensing electrodes RX surrounds each of the n touch driving electrodes TX.

Figure 4:
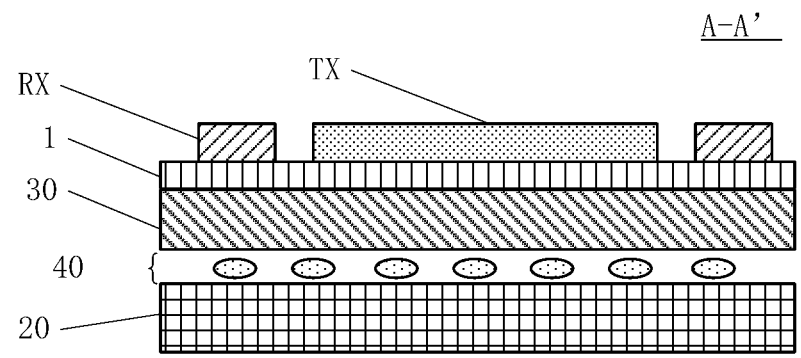
FIG. 4 is a cross-sectional view taken along line A-A' of FIG. 1.

The n touch driving electrodes TX and the plurality of touch sensing electrodes RX are disposed in a same layer. The n touch driving electrodes TX may be made of indium tin oxide, and the plurality of touch sensing electrodes RX may be made of indium tin oxide. In an actual design, as long as it has good electrical conductivity. Indium tin oxide is a transparent conductive material, which does not affect the display effect of the touch display panel. In addition, since indium tin oxide is a transparent conductive material, the n touch driving electrodes TX and the plurality of touch sensing electrodes RX do not need to be aligned with a pixel opening area in the display panel, and light transmittance of the display panel 100 is not affected. Referring to FIG. 4, FIG. 4 is a cross-sectional view taken along line A-A' of FIG. 1. A liquid crystal touch display panel is shown in FIG. 4, and the liquid crystal touch display panel includes an array substrate 20 and a color film substrate disposed opposite to each other. A liquid crystal layer 40 is sandwiched between the array substrate 20 and the color film substrate 30. A base substrate 1 is disposed on a side of the color film substrate 30 away from the array substrate 20. The n touch driving electrodes TX, and the plurality of touch sensing electrodes RX surrounding each of the n touch driving electrodes TX are disposed on the base substrate. Optionally, the n touch driving electrodes TX and the plurality of touch sensing electrodes RX are made of indium tin oxide.

The touch display panel provided by the present disclosure may be an organic light emitting diode display panel, and may also be a liquid crystal display panel. When the touch display panel 100 is a liquid crystal display panel, a base substrate may be one of an array substrate and a color film substrate in the liquid crystal display panel. When the touch display panel 100 is an organic light emitting diode panel, a base substrate may be an array substrate in the organic light emitting diode panel.

The integrated circuit IC sends the touch driving signals to the n touch driving electrodes TX to perform the touch scan, and the integrated circuit IC receives the sensing signal change quantities of the plurality of touch sensing electrodes RX surrounding a same one of the n touch driving electrodes TX, to determine the touch position. The three-dimensional coordinates at the time of the touch are determined by a principle of electric near-field sensing.

When the integrated circuit IC sends the touch driving signals to the n touch driving electrodes TX to perform the touch scan, the touch driving signals may be sent to the n touch driving electrodes TX at a same time, and may also be sequentially sent to the n touch driving electrodes TX. After the touch scan, the integrated circuit IC receives the sensing signal change quantities of the plurality of touch sensing electrodes RX surrounding a same one of the n touch driving electrodes TX, to determine the touch position.

When a user approaches the touch display panel, the touch position is determined by detecting the sensing signal change quantities of the plurality of touch sensing electrodes RX. The sensing signal change quantities may mainly be affected by two factors: one is whether there is a touch, and second is a ground capacitance of the plurality of touch sensing electrodes RX. In an actual design, the shape or material of the plurality of touch sensing electrodes RX may be different, and the ground capacitance of the plurality of touch sensing electrodes RX may also be different. The touch position information can be obtained through the sensing signal change quantities of the plurality of touch sensing electrodes RX and a calculation. The three-dimensional coordinates of the touch position are obtained by a software algorithm in the integrated circuit IC.

Figure 5:
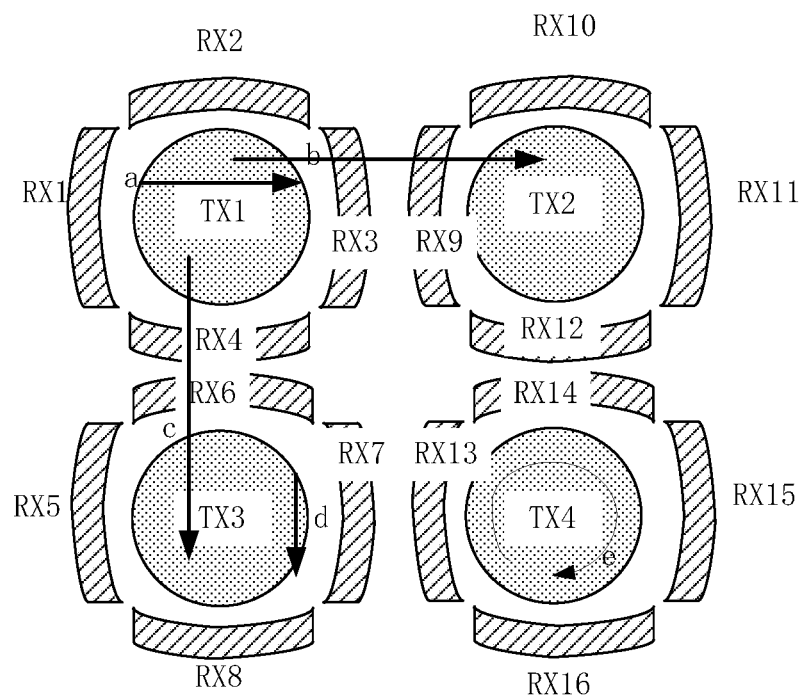
FIG. 5 is a schematic diagram of determining a touch position by sensing signal change quantities in an exemplary touch display panel according to various embodiments of the present disclosure.

Referring to FIG. 5, FIG. 5 is a schematic diagram of determining a touch position by sensing signal change quantities in an exemplary touch display panel according to various embodiments of the present disclosure. The touch display panel of the present disclosure is for several three-dimensional touch gesture operations. The three-dimensional touch gesture operations mainly have horizontal, vertical, and circular gestures, and the touch position is determined as follows.

For a horizontal gesture, gesture a in FIG. 5, RX1 and RX3 of the plurality of touch sensing electrodes receive sensing signal change quantities. When a touch object (such as a finger) approaches a surface of the touch display panel, and performs the horizontal gesture, such as with a distance from the touch display panel as about 15 cm, referring to FIG. 5, ground capacitances corresponding to the touch sensing electrodes RX1 and RX3 are respectively C1 and C3, and a touch start position and a touch end position correspond to a touch driving electrode TX1. Since the touch sensing electrodes RX1 and RX3 surrounding the touch driving electrode TX1 are closest to the touch start position and the touch end position, sensing signal change quantities are relatively large. Touch sensing electrodes RX9, RX11, RX5, RX7, RX13, and RX15 are far from each of the touch start position and the touch end position, sensing signal change quantities are small, and sensing signals fed back to the integrated circuit IC are weak. Sensing signal change quantities mainly come from the sensing signal change quantities caused by the ground capacitances C1 and C3 during the touch, the integrated circuit IC determines the touch position by the sensing signal change quantities of the touch sensing electrodes RX1 and RX3.

For a horizontal gesture, gesture b pointing from the touch driving electrode TX1 to a touch driving electrode TX2 in FIG. 5, touch sensing electrodes RX1, RX3, RX9, and RX11 of the plurality of touch sensing electrodes receive sensing signal change quantities. When a touch object (such as a finger) is close to the surface of the touch display panel, and performs the horizontal gesture, such as with a distance from the touch display panel as about 15 cm, referring to FIG. 5, ground capacitances corresponding to the touch sensing electrodes RX1, RX3, RX9, and RX11 are C1, C3, C9, and C11, respectively. A touch start position corresponds to the touch driving electrode TX1. Since the touch sensing electrodes RX1 and RX3 surrounding the touch driving electrode TX1 are closest to the touch start position, sensing signal change quantities are relatively large. Touch sensing electrodes RX5, RX7, RX13, and RX15 are far from the touch start position, and sensing signal change quantities are small. A corresponding touch end position corresponds to the touch driving electrode TX2. Since the touch sensing electrodes RX9 and RX11 surrounding the touch driving electrode TX2 are closest to the touch end position, sensing signal change quantities are relatively large. Touch sensing electrodes RX5, RX7, RX13, and RX15 are far from each of the touch start position and the touch end position, sensing signal change quantities are small, and sensing signals fed back to the integrated circuit IC are weak. Sensing signal change quantities mainly come from the sensing signal change quantities caused by the ground capacitances C1, C3, C9, and C11 during the touch, the integrated circuit IC determines the touch position by two largest sensing signal change quantities among the sensing signal change quantities of the touch sensing electrodes RX1, RX3, RX9, and RX11.

For a vertical gesture, gesture d in FIG. 5, RX6 and RX8 of the plurality of touch sensing electrodes receive sensing signal change quantities. When a touch object (such as a finger) approaches the surface of the touch display panel, and performs the vertical gesture, such as with a distance from the touch display panel as about 15 cm, referring to FIG. 5, ground capacitances corresponding to the touch sensing electrodes RX6 and RX8 are respectively C6 and C8, and a touch start position and a touch end position correspond to a touch driving electrode TX3. Since the touch sensing electrodes RX6 and RX8 surrounding the touch driving electrode TX3 are closest to the touch start position and the touch end position, sensing signal change quantities are relatively large. Touch sensing electrodes RX2, RX4, RX10, RX12, RX14, and RX16 are far from each of the touch start position and the touch end position, sensing signal change quantities are small, and sensing signals fed back to the integrated circuit IC are weak. Sensing signal change quantities mainly come from the sensing signal change quantities caused by the ground capacitances C6 and C8 during the touch, the integrated circuit IC determines the touch position by the sensing signal change quantities of the touch sensing electrodes RX6 and RX8.

For a vertical gesture, gesture c in FIG. 5, touch sensing electrodes RX2, RX4, RX6, and RX8 of the plurality of touch sensing electrodes receive sensing signal change quantities. When a touch object (such as a finger) is close to the surface of the touch display panel, and performs the vertical gesture, such as with a distance from the touch display panel as about 15 cm, referring to FIG. 5, ground capacitances corresponding to the touch sensing electrodes RX2, RX4, RX6, and RX8 are C2, C4, C6, and C8, respectively. A touch start position corresponds to the touch driving electrode TX1. Since the touch sensing electrodes RX2 and RX4 surrounding the touch driving electrode TX1 are closest to the touch start position, sensing signal change quantities are relatively large. Touch sensing electrodes RX10, RX12, RX14, and RX16 are far from the touch start position, and sensing signal change quantities are small. A corresponding touch end position corresponds to the touch driving electrode TX2. Since the touch sensing electrodes RX6 and RX8 surrounding the touch driving electrode TX2 are closest to the touch end position, sensing signal change quantities are relatively large. Touch sensing electrodes RX10, RX12, RX14, and RX16 are far from each of the touch start position and the touch end position, sensing signal change quantities are small, and sensing signals fed back to the integrated circuit IC are weak. Sensing signal change quantities mainly come from the sensing signal change quantities caused by the ground capacitances C2, C4, C6, and C8 during the touch, the integrated circuit IC determines the touch position by two largest sensing signal change quantities among the sensing signal change quantities of the touch sensing electrodes RX2, RX4, RX6, and RX8.

For a circular gesture, gesture e in FIG. 5, RX13, RX14, RX15 and RX16 of the plurality of touch sensing electrodes receive sensing signal change quantities. When a touch object (such as a finger) approaches the surface of the touch display panel, and performs the circular gesture, such as with a distance from the touch display panel as about 15 cm, referring to FIG. 5, ground capacitances corresponding to the touch sensing electrodes RX13, RX14, RX15 and RX16 are respectively C13, C14, C15 and C16, and a touch start position and a touch end position correspond to a touch driving electrode TX4. Since the touch sensing electrodes RX13, RX14, RX15 and RX16 surrounding the touch driving electrode TX4 are closest to the touch start position and the touch end position, sensing signal change quantities are relatively large. Touch sensing electrodes RX1, RX2, RX3, RX4, RX5, RX6, RX7, RX8, RX9, RX10, RX11, and RX12 are far from each of the touch start position and the touch end position, sensing signal change quantities are small, and sensing signals fed back to the integrated circuit IC are weak. Sensing signal change quantities mainly come from the sensing signal change quantities caused by the ground capacitances C13, C14, C15 and C16 during the touch, the integrated circuit IC determines the touch position by two largest sensing signal change quantities among the sensing signal change quantities of the touch sensing electrodes RX13, RX14, RX15 and RX16.

An existing electric field type three-dimensional touch technology adopts a design in which a driving electrode is in the middle and sensing electrodes are surrounding. The existing design is only suitable for a three-dimensional touch scheme of a small-sized display panel. For a medium-sized or large-sized display panel, when a driving electrode is in the middle, signal amplitude of surrounding sensing electrodes is weak, resulting in insensitive touch, low touch precision, and inability to use a 3D touch, which affects 3D touch experience and cannot be used on a large-sized display panel. Furthermore, the three-dimensional touch in the existing design is mainly applied to a small-sized display panel, and only some simple gesture functions are performed, so that a single touch driving electrode can be generally satisfied. If a plurality of touch driving electrodes is disposed, a number of channels will increase, and a production process will increase in difficulty. Also, when the existing technology is applied to a large-sized display panel (such as a twenty-inch touch display panel), the touch precision is low, the response is slow, and the user experience is poor. Therefore, in the touch display panel of the present disclosure, n touch driving electrodes TX are arranged in an array on a base substrate 1. Each of the n touch driving electrodes TX is surrounded by a plurality of touch sensing electrodes RX. An integrated circuit IC sends touch driving signals to the n touch driving electrodes TX to perform a touch scan. The integrated circuit IC receives sensing signal change quantities of the plurality of touch sensing electrodes RX surrounding a same one of the n touch driving electrodes TX, to determine a touch position. The touch display panel of the present disclosure adapts to a three-dimensional touch of a large-sized display panel, can accurately determine the touch position, has sensitive touch, and has high touch precision. Furthermore, since the present disclosure is applied to a large-sized display panel (for example, a twenty-inch touch display panel), when a plurality of touch driving electrodes is disposed, the manufacturing process will not be difficult due to an increase in the number of channels.

The touch display panel of the present disclosure has at least the following technical effects.

In the touch display panel of the present disclosure, n touch driving electrodes TX are arranged in an array on a base substrate 1. Each of the n touch driving electrodes TX is surrounded by a plurality of touch sensing electrodes RX. An integrated circuit IC sends touch driving signals to the n touch driving electrodes TX to perform a touch scan. The integrated circuit IC receives sensing signal change quantities of the plurality of touch sensing electrodes RX surrounding a same one of the n touch driving electrodes TX, to determine a touch position. The touch display panel of the present disclosure adapts to a three-dimensional touch of a large-sized display panel, can accurately determine the touch position, has sensitive touch, and has high touch precision.

Referring to FIG. 1, orthographic projections of the n touch driving electrodes TX on the base substrate 1 nonoverlap orthographic projections of the plurality of touch sensing electrodes RX on the base substrate 1.

Insulation between the n touch driving electrodes TX and the plurality of touch sensing electrodes RX is required to avoid causing signal interference, which may result in a touch not being recognized, and a touch position not being determined. When the orthographic projections of the n touch driving electrodes TX on the base substrate 1 nonoverlap the orthographic projections of the plurality of touch sensing electrodes RX on the base substrate 1, it helps to insulate them, to recognize the touch, and to determine the touch position.

Figure 6:
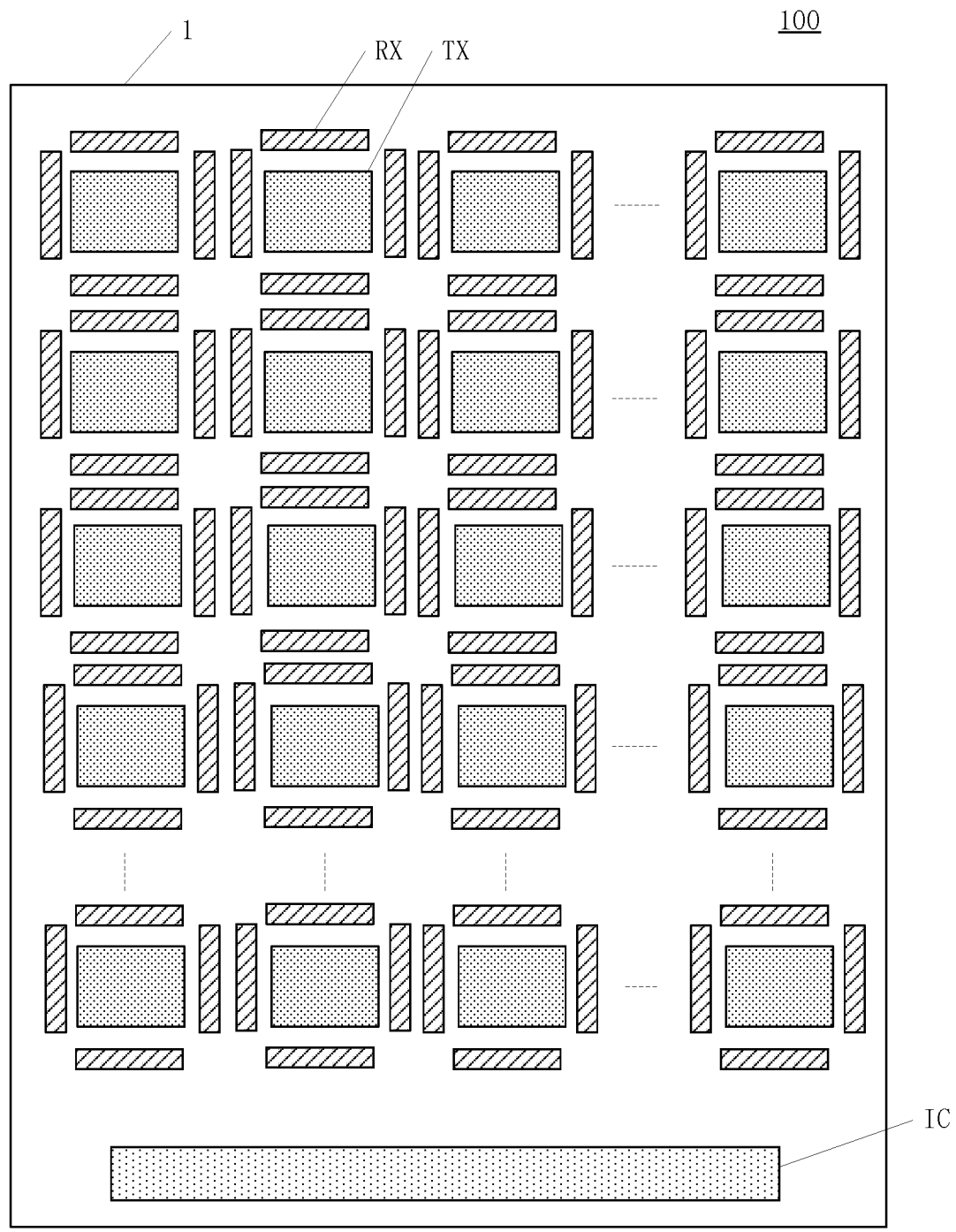
FIG. 6 is a schematic diagram of another planar structure of an exemplary touch display panel according to various embodiments of the present disclosure.

Referring to FIG. 6, FIG. 6 is a schematic diagram of another planar structure of an exemplary touch display panel according to various embodiments of the present disclosure. Orthographic projections of the n touch driving electrodes on the base substrate are rectangular, and four of the plurality of touch sensing electrodes surrounds each of the n touch driving electrodes.

The first signal lines connecting the n touch driving electrodes TX to the integrated circuit IC are not shown in FIG. 6, and the second signal lines connecting the plurality of touch sensing electrodes RX to the integrated circuit IC are also not shown. Alternative wiring of the first signal lines and the second signal lines may be referred to FIG. 1.

Compared to the touch display panel shown in FIG. 1, orthographic projections of n touch driving electrodes TX on a base substrate in a touch display panel 100 according to one embodiment is rectangular, and four of a plurality of touch sensing electrodes RX surrounds each of the n touch driving electrodes. The n touch driving electrodes TX are disposed in a same layer as the plurality of touch sensing electrodes RX, four of the plurality of touch sensing electrodes RX are insulated from each other, and the n touch driving electrodes TX are insulated from each other. An integrated circuit IC sends touch driving signals to the n touch driving electrodes TX to perform a touch scan, and the integrated circuit IC receives sensing signal change quantities of the plurality of touch sensing electrodes RX surrounding a same one of the n touch driving electrodes TX, to determine a touch position.

In one embodiment, the orthographic projections of the n touch driving electrodes TX on the base substrate are rectangular, which is favorable for fabrication. A number of the plurality of touch sensing electrodes RX is four, which is convenient to manufacture. The rectangular shape is convenient for an array arrangement and a compact arrangement, and is conducive to an accurate determination of the touch position.

Figure 7:
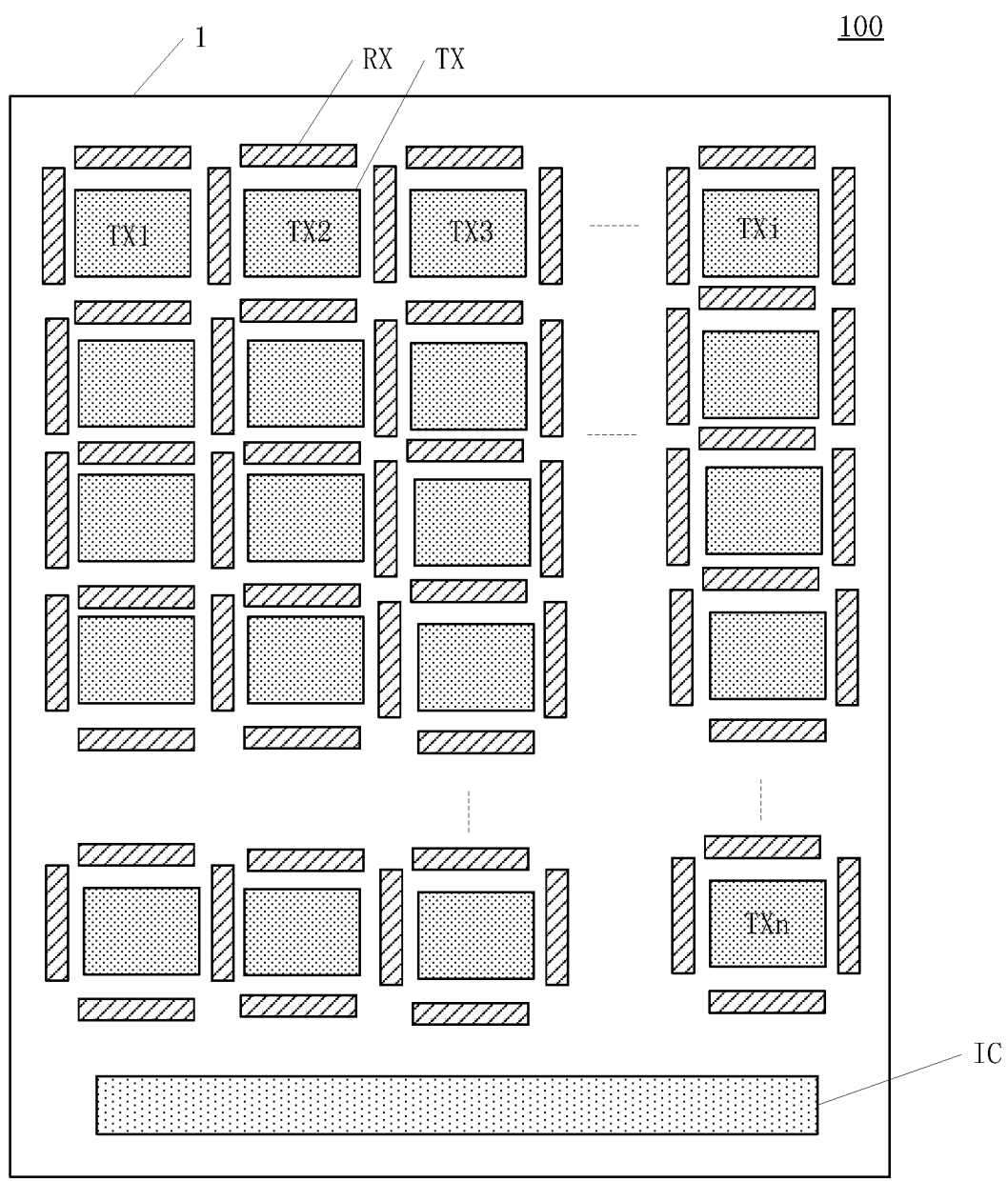
FIG. 7 is a schematic diagram of another planar structure of an exemplary touch display panel according to various embodiments of the present disclosure.

Referring to FIG. 7, FIG. 7 is a schematic diagram of another planar structure of an exemplary touch display panel according to various embodiments of the present disclosure. At least one touch sensing electrode is disposed between adjacent two touch driving electrodes, and the at least one touch sensing electrode serves as a touch sensing electrode corresponding to the adjacent two touch driving electrodes.

In FIG. 7, only one touch sensing electrode RX is included between touch driving electrodes TX, and the one touch sensing electrode RX is used as a touch sensing electrode RX corresponding to the adjacent two touch driving electrodes TX, as shown in FIG. 7. The one touch sensing electrode RX is shared between the adjacent two touch driving electrodes TX.

The first signal lines connecting the n touch driving electrodes TX to the integrated circuit IC are not shown in FIG. 7, and the second signal lines connecting the plurality of touch sensing electrodes RX to the integrated circuit IC are also not shown. Alternative wiring of the first signal lines and the second signal lines may be referred to FIG. 1.

Sharing the at least one touch sensing electrode RX between the adjacent two touch driving electrodes TX can reduce a number of touch sensing electrodes RX, simplify the manufacturing process, and reduce the wiring.

Referring to FIG. 7, in other optional embodiments, the integrated circuit IC sends touch driving signals to the n touch driving electrodes one after another to perform the touch scan.

In the touch display panel shown in FIG. 1 and FIG. 5, when only one finger touches, a touch position can be determined. When multiple fingers touch at a same time, for example, two fingers touch positions of TX1 and TX2 at a same time, RX between TX1 and TX2 will receive sensing signal change quantities at the same time, then a touch position cannot be determined. When the integrated circuit IC sends the touch driving signals to the n touch driving electrodes one after another to perform the touch scan, the integrated circuit IC sends the touch driving signals to the touch driving electrode TX1 first, and receives sensing signal change quantities of the plurality of touch sensing electrodes RX surrounding a same touch driving electrode TX, to determine the touch position; and then the integrated circuit IC sends the touch driving signals to the touch driving electrode TX2, and receives sensing signal change quantities of the plurality of touch sensing electrodes RX surrounding a same touch driving electrode TX, to determine the touch position, thereby accurately determining the touch position, and avoiding a problem that the touch position cannot be determined when adjacent touch driving electrodes TX share a touch sensing electrode RX and cause interference. A method of determining the touch position can be referred to the above, and will not be described again here.

The display panel includes a row direction X and a column direction Y, and the row direction X and the column direction Y intersect each other. The plurality of touch sensing electrodes RX is arranged in the row direction X, and extends in the column direction Y; or the plurality of touch sensing electrodes RX is arranged in the column direction Y, and extends in the row direction X.

Figure 8:
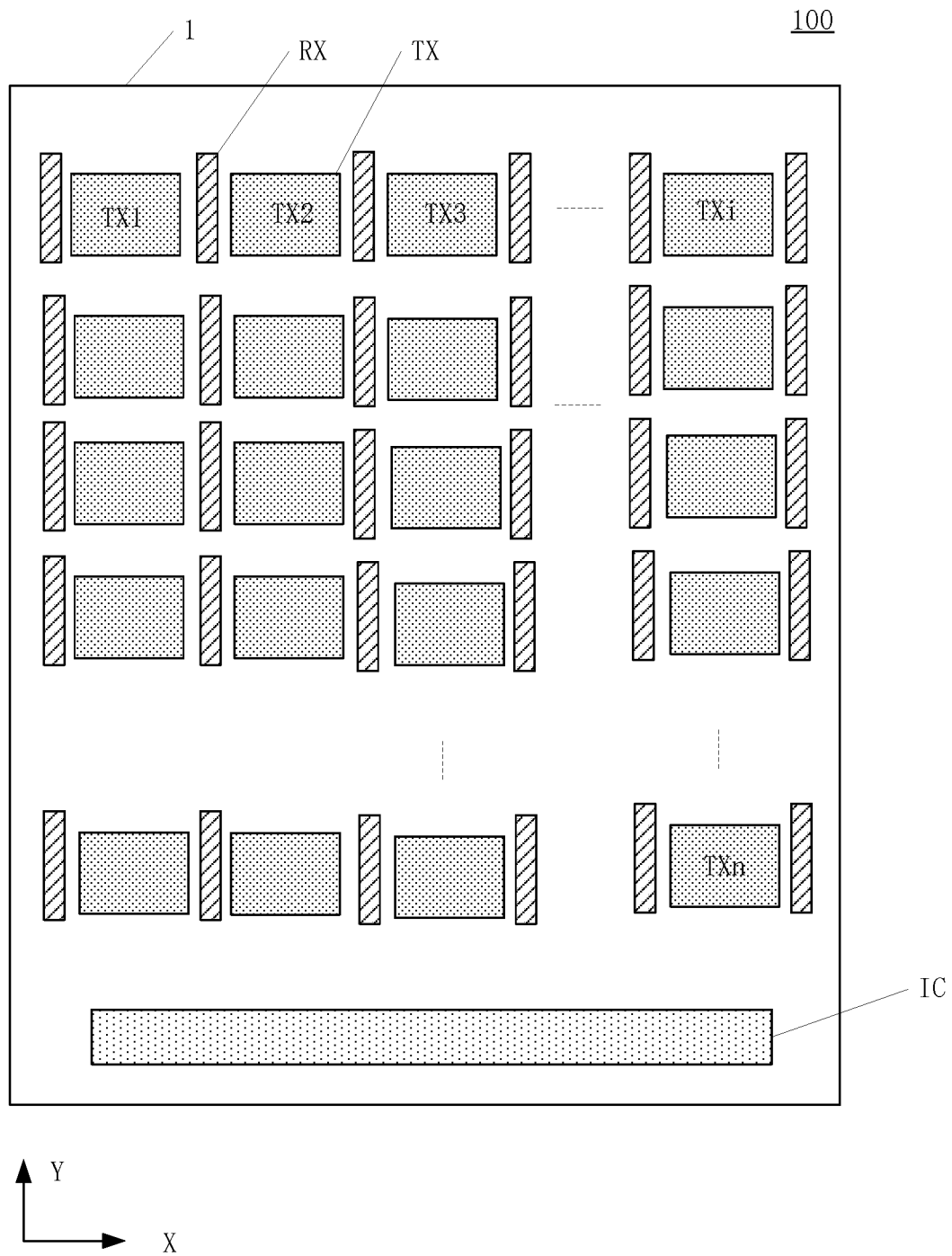
FIG. 8 is a schematic diagram of another planar structure of an exemplary touch display panel according to various embodiments of the present disclosure.
Figure 9:
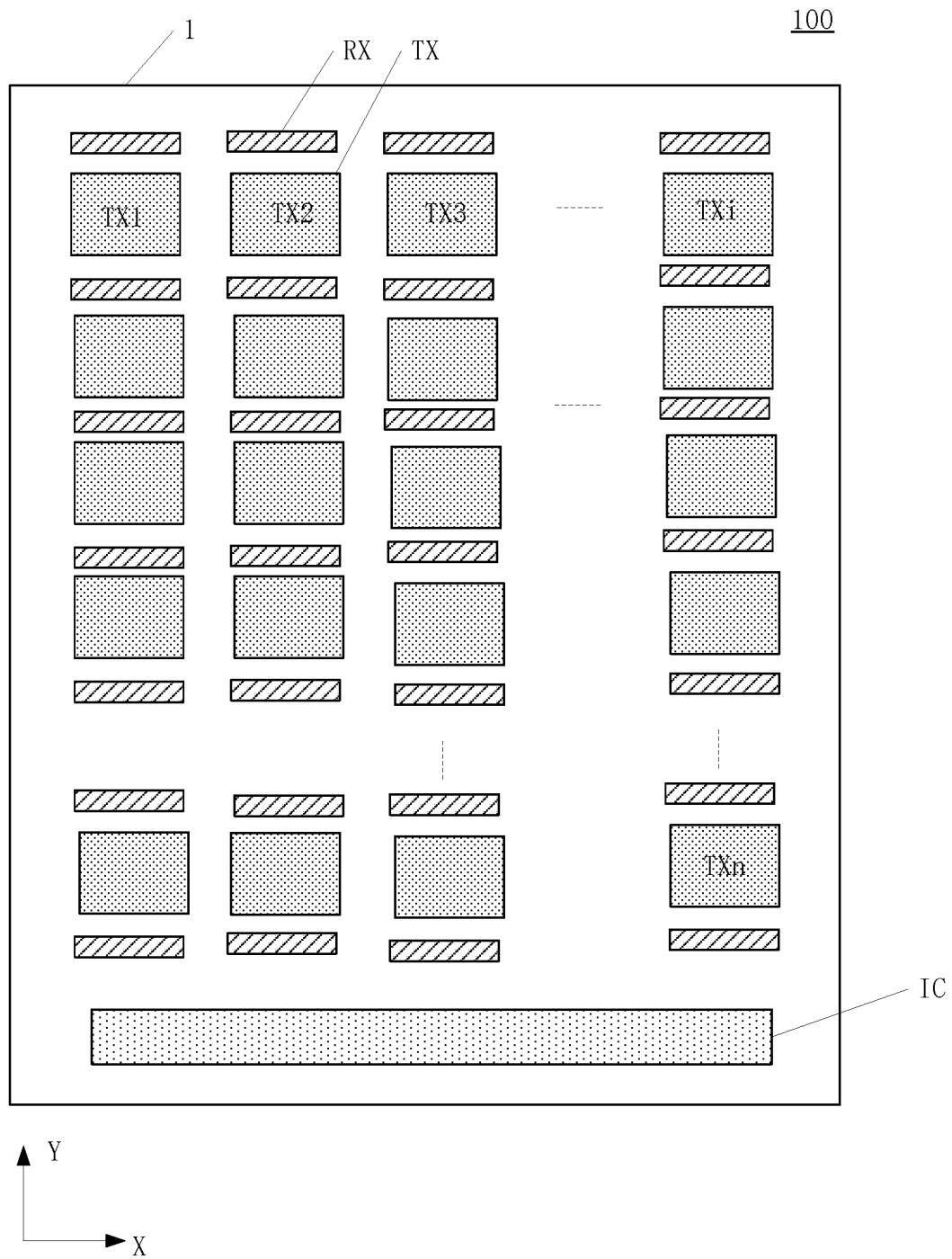
FIG. 9 is a schematic diagram of another planar structure of an exemplary touch display panel according to various embodiments of the present disclosure.

Referring to FIG. 8 and FIG. 9, FIG. 8 is a schematic diagram of another planar structure of an exemplary touch display panel according to various embodiments of the present disclosure. FIG. 9 is a schematic diagram of another planar structure of an exemplary touch display panel according to various embodiments of the present disclosure. In FIG. 8, the plurality of touch sensing electrodes RX is arranged in the row direction X, and extends in the column direction Y. In FIG. 9, the plurality of touch sensing electrodes RX is arranged in the column direction Y, and extends in the row direction X.

A setting of the plurality of touch sensing electrodes RX in FIG. 8 is used for detecting a horizontal touch. A setting of the plurality of touch sensing electrodes RX in FIG. 9 is used for detecting a vertical touch. Detection methods can be referred to the above, and details are not described here.

The first signal lines connecting the n touch driving electrodes TX to the integrated circuit IC are not shown in FIG. 8 and FIG. 9, and the second signal lines connecting the plurality of touch sensing electrodes RX to the integrated circuit IC are also not shown. Alternative wiring of the first signal lines and the second signal lines can be referred to FIG. 1.

In the touch display panel of the present disclosure, n touch driving electrodes TX are arranged in an array on a base substrate 1. Each of the n touch driving electrodes TX is surrounded by a plurality of touch sensing electrodes RX. An integrated circuit IC sends touch driving signals to the n touch driving electrodes TX to perform a touch scan, and receives sensing signal change quantities of the plurality of touch sensing electrodes RX surrounding a same one of the n touch driving electrodes TX, to determine a touch position. In one embodiment, one of a horizontal touch and a vertical touch can be determined.

Continuing to refer to FIGS. 8 and 9, the display panel includes the row direction and the column direction, and the row direction and the column direction intersect each other. Each of the plurality of touch sensing electrodes is strip-shaped, extending in one of the row direction and the column direction.

Strip-shaped touch sensing electrodes RX can be disposed in a non-opening area of the touch display panel, and do not affect normal display of the touch display panel.

The setting of the plurality of touch sensing electrodes RX in FIG. 8 is used for detecting a horizontal touch. The setting of the plurality of touch sensing electrodes RX in FIG. 9 is used for detecting a vertical touch. Detection methods can be referred to the above, and details are not described here. In FIG. 8, when the horizontal touch is determined, a touch position is determined according to sensing signal change quantities of touch sensing electrodes RX on left and right sides of a touch driving electrode TX. In FIG. 9, when the vertical touch is determined, a touch position is determined according to sensing signal change quantities of touch sensing electrodes RX on upper and lower sides of a touch driving electrode TX.

The display panel may include a row direction X and a column direction Y, and the row direction X and the column direction Y intersect each other. Each of the plurality of touch sensing electrodes is block-shaped, and a plurality of block-shaped touch sensing electrodes constitutes a touch sensing electrode group, and the touch sensing electrode group is arranged in one of the row direction and the column direction.

Figure 10:
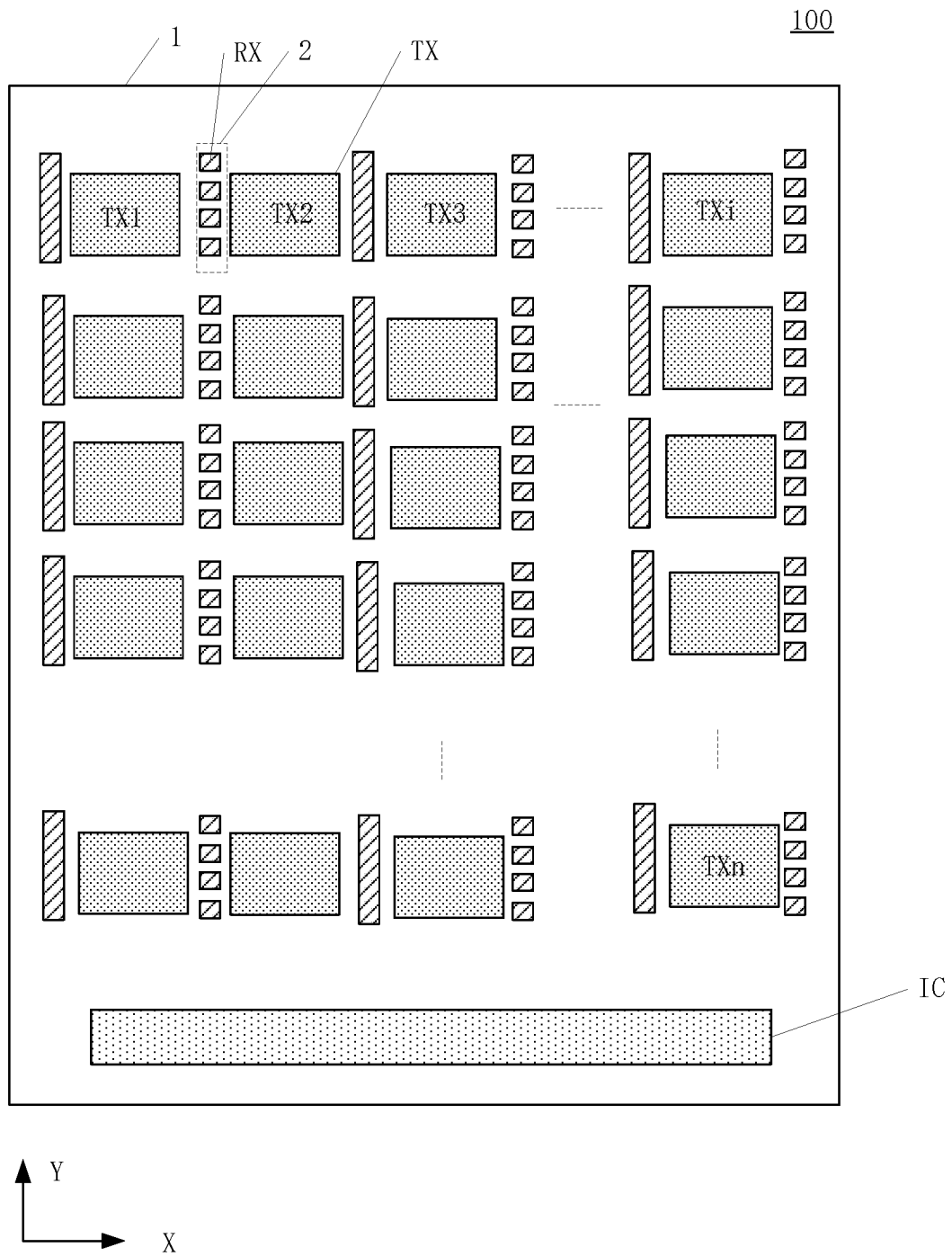
FIG. 10 is a schematic diagram of another planar structure of an exemplary touch display panel according to various embodiments of the present disclosure.
Figure 11:
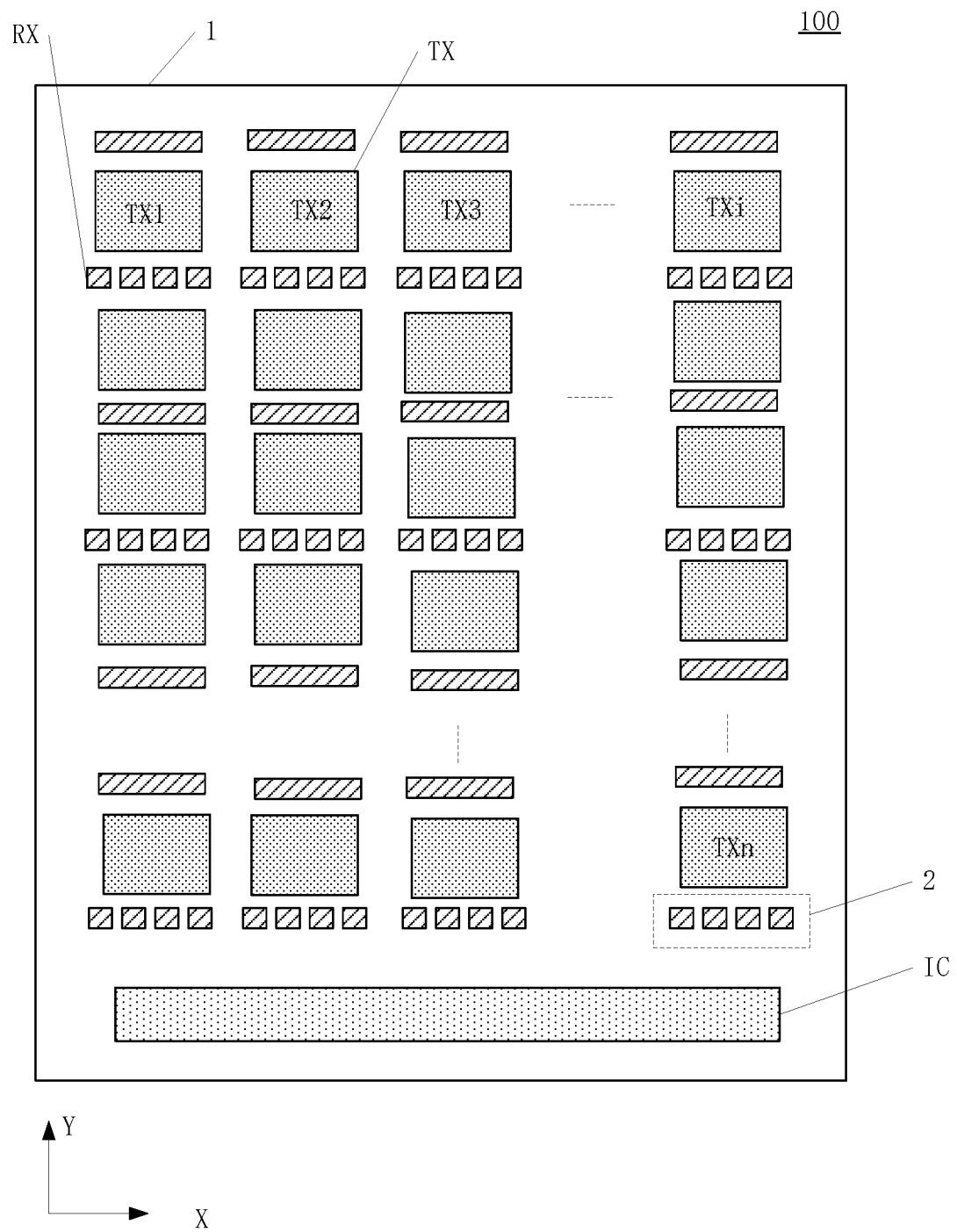
FIG. 11 is a schematic diagram of another planar structure of an exemplary touch display panel according to various embodiments of the present disclosure.

Referring to FIG. 10 and FIG. 11, FIG. 10 is a schematic diagram of another planar structure of an exemplary touch display panel according to various embodiments of the present disclosure. FIG. 11 is a schematic diagram of another planar structure of an exemplary touch display panel according to various embodiments of the present disclosure. In FIG. 10, each of a plurality of touch sensing electrodes RX is block-shaped, and four block-shaped touch sensing electrodes RX constitute a touch sensing electrode group 2, and the touch sensing electrode groups 2 is arranged in the column direction. In FIG. 11, each of a plurality of touch sensing electrodes RX is block-shaped, and four block-shaped touch sensing electrodes RX constitute a touch sensing electrode group 2, and the touch sensing electrode groups 2 is arranged in the row direction.

The first signal lines connecting the n touch driving electrodes TX to the integrated circuit IC are not shown in FIG. 10 and FIG. 11, and the second signal lines connecting the plurality of touch sensing electrodes RX to the integrated circuit IC are also not shown. Alternative wiring of the first signal lines and the second signal lines can be referred to FIG. 1.

Compared to the touch display panel shown in FIG. 8, the touch display panel shown in FIG. 10 has a function of not only recognizing a horizontal touch but also recognizing a vertical touch. Since one touch sensing electrode group includes a plurality of touch sensing electrodes, in response to a vertical touch, there are sensing signal change quantities of each touch sensing electrode RX arranged in the column direction Y of the one touch sensing electrode group 2. The integrated circuit determines the touch position according to two touch sensing electrodes that receive greatest sensing signal change quantities among sensing signal change quantities of the plurality of touch sensing electrodes.

Similarly, compared to the touch display panel shown in FIG. 9, the touch display panel shown in FIG. 11 has a function of not only recognizing a horizontal touch but also recognizing a vertical touch. Since one touch sensing electrode group includes a plurality of touch sensing electrodes, in response to is a horizontal touch, there are sensing signal change quantities of each touch sensing electrode RX arranged in the row direction X of the one touch sensing electrode group 2. The integrated circuit determines the touch position according to two touch sensing electrodes that receive greatest sensing signal change quantities among sensing signal change quantities of the plurality of touch sensing electrodes.

Figure 12:
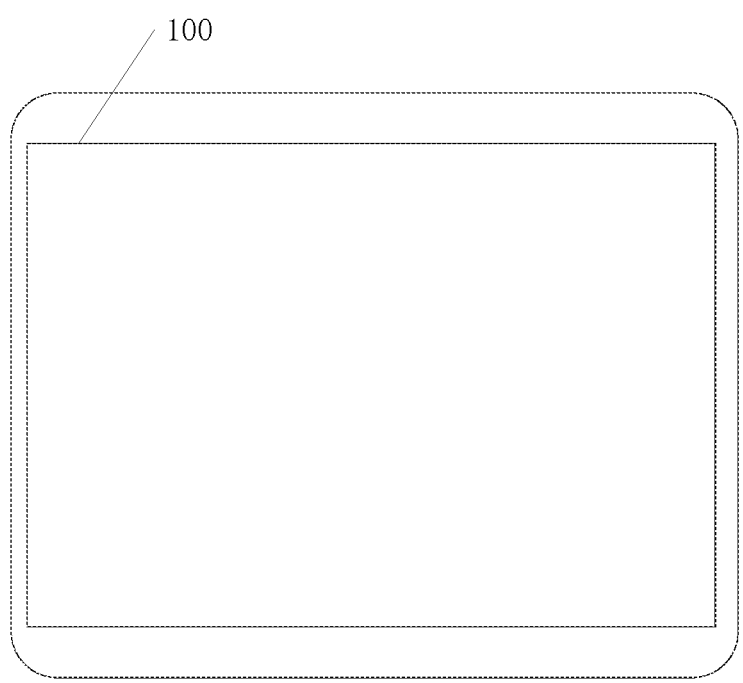
FIG. 12 is a schematic structural diagram of an exemplary touch display device according to various embodiments of the present disclosure.

As shown in FIG. 12, FIG. 12 is a schematic structural diagram of an exemplary touch display device according to various embodiments of the present disclosure. The present disclosure further provides a touch display device 200 including a touch display panel 100 described in the above embodiments. The touch display device 200 has a large-sized touch display panel 100. The touch display panel 100 has n touch driving electrodes arranged in an array on a base substrate, and each of the n touch driving electrodes is surrounded by a plurality of touch sensing electrodes. An integrated circuit sends touch driving signals to the n touch driving electrodes to perform a touch scan. The integrated circuit receives sensing signal change quantities of the plurality of touch sensing electrodes surrounding a same one of the n touch driving electrodes, to determine a touch position. It not only can adapt to a three-dimensional touch of a large-sized display panel, but also can accurately determine the touch position, has sensitive touch, and has high touch precision.

The present disclosure further provides a touch detection method, for a touch display panel of the above embodiments. The touch display panel includes a base substrate, n touch driving electrodes arranged in an array on the base substrate, and a plurality of touch sensing electrodes disposed surrounding each of the n touch driving electrodes. The n touch driving electrodes are disposed in a same layer as the plurality of touch sensing electrodes, the plurality of touch sensing electrodes is insulated from each other, and the n touch driving electrodes are insulated from each other. The touch display panel further includes an integrated circuit, and the plurality of touch driving electrodes and the n driving sensing electrodes are electrically connected to the integrated circuit.

The touch detection method includes: a working time of the touch display panel being within one frame period, the integrated circuit sending touch driving signals to the n touch driving electrodes to perform a touch scan, and the integrated circuit receiving sensing signal change quantities of the plurality of touch sensing electrodes surrounding a same one of the n touch driving electrodes, and determining a touch position.

In the touch display panel of the present disclosure, n touch driving electrodes are arranged in an array on a base substrate 1, and each of the n touch driving electrodes is surrounded by a plurality of touch sensing electrodes. An integrated circuit sends touch driving signals to the n touch driving electrodes to perform a touch scan. The integrated circuit receives sensing signal change quantities of the plurality of touch sensing electrodes surrounding a same one of the n touch driving electrodes, to determine a touch position. It not only can adapt to a three-dimensional touch of a large-sized display panel, but also can accurately determine the touch position, has sensitive touch, and has high touch precision.

In some optional embodiments, the integrated circuit determines the touch position according to two touch sensing electrodes that receive greatest sensing signal change quantities among sensing signal change quantities of the plurality of touch sensing electrodes.

Referring to a schematic diagram of determining a touch position by sensing signal change quantities, shown in FIG. 5, two touch sensing electrodes that receive greatest sensing signal change quantities among sensing signal change quantities of the plurality of touch sensing electrodes are used to determine the touch position, which can accurately determine the touch position, has sensitive touch, and has high touch precision.

In some optional embodiments, the integrated circuit sends the touch driving signals to the n touch driving electrodes one after another to perform the touch scan.

Referring to FIG. 1 and FIG. 5, an integrated circuit IC sends touch driving signals to n touch driving electrodes one after another to perform a touch scan. The integrated circuit IC first sends touch driving signals to a touch driving electrode TX1, and receives sensing signal change quantities of a plurality of touch sensing electrodes RX surrounding a same touch driving electrode TX, to determine a touch position; and then the integrated circuit IC sends touch driving signals to a touch driving electrode TX2, and receives sensing signal change quantities of a plurality of touch sensing electrodes RX surrounding a same touch driving electrode TX, to determine a touch position; thereby accurately determining the touch position, and avoiding a problem that the touch position cannot be determined when adjacent touch driving electrodes TX share a touch sensing electrode RX and cause interference.

In some optional embodiments, in response to zero touch action, the integrated circuit sends touch driving signals to selected touch driving electrodes of the n touch driving electrodes, that adjacent touch driving electrodes of the selected touch driving electrodes are separated by at least one touch driving electrode, to which no touch driving signals are sent, of the n touch driving electrodes.

Considering a power consumption of the display panel, in response to zero touch action, the integrated circuit sends touch driving signals to selected touch driving electrodes of the n touch driving electrodes, that adjacent touch driving electrodes of the selected touch driving electrodes are separated by at least one touch driving electrode, to which no touch driving signals are sent, of the n touch driving electrodes, thereby reducing power consumption. In response to zero touch action, a frequency at which the integrated circuit sends the touch driving signals to the n touch driving electrodes can be reduced, and the power consumption can also be reduced.

According to the foregoing embodiments, the touch display panel, the touch display device, and the touch detection method provided by the present disclosure have at least the following technical effects.

In the touch display panel of the present disclosure, n touch driving electrodes are arranged in an array on a base substrate. Each of the n touch driving electrodes is surrounded by a plurality of touch sensing electrodes. An integrated circuit sends touch driving signals to the n touch driving electrodes to perform a touch scan. The integrated circuit IC receives sensing signal change quantities of the plurality of touch sensing electrodes surrounding a same one of the n touch driving electrodes, to determine a touch position. It not only can adapt to a three-dimensional touch of a large-sized display panel, but also can accurately determine the touch position, has sensitive touch, and has high touch precision.

Any product embodying the present disclosure does not necessarily have to specifically meet all of the technical effects described above.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. The scope of the present disclosure is defined by the appended claims.

What is claimed is:

1. A touch display panel, comprising:
   a base substrate;
   n touch driving electrodes, electrically insulated from each other and arranged in an array on the base substrate;
   a plurality of touch sensing electrodes, insulated from each other and around each of the n touch driving electrodes, wherein the n touch driving electrodes are disposed in a same layer as the plurality of touch sensing electrodes, and each of to plurality of touch sensing electrodes is connected to an integrated circuit through a corresponding signal line, respectively;
   the integrated circuit, wherein the integrated circuit is configured to send touch driving signals to the n touch driving electrodes to form a three-dimensional electric field near a surface of the touch display panel and perform a touch scan, and to receive sensing signal change quantities of the plurality of touch sensing electrodes around a same one of then touch driving electrodes, to determine three-dimensional coordinates of a touch position;
   first signal lines routing from a first side of the touch display panel, each of the first signal lines including a first section, a second section parallel to the first section, and a third section extending along the first side and connecting the first section and the second section, wherein each of the plurality of touch sensing electrodes is connected to the integrated circuit through a corresponding first signal line routing from the first side of the touch display panel; and
   second signal lines routing from a second side opposite to the first side of the touch display panel, each of the second signal lines including a first section, a second section parallel to the first section, and a third section extending along the second side and connecting the first section and the second section, wherein each of the plurality of touch driving electrodes is connected to the integrated circuit through a corresponding second signal line routing from the second side opposite to the first side of the touch display panel, and a projection of the first signal lines on the base substrate has no overlap with a projection of the second signal lines on the base substrate,
   wherein:
      the touch display panel includes a row direction and a column direction, intersecting each other,
      the first sections of some of the first signal lines are located between adjacent touch sensing electrodes, and the first sections of some of the second signal lines are located between adjacent touch sensing electrodes,
      the n touch driving electrodes and the plurality of touch sensing electrodes are electrically connected to the integrated circuit,
      each of the plurality of touch sensing electrodes is electrically insulated from each other and connected to the integrated circuit, respectively, and
      two of the plurality of touch sensing electrodes corresponding to two adjacent touch driving electrodes arranged in the row direction are located between the two adjacent touch driving electrodes arranged in the row direction, and two of the plurality of touch sensing electrodes corresponding to two adjacent touch driving electrodes arranged in the column direction are located between the two adjacent touch driving electrodes arranged in the column direction.

2. The touch display panel according to claim 1, wherein:
   orthographic projections of the n touch driving electrodes on the base substrate non-overlap orthographic projections of the plurality of touch sensing electrodes on the base substrate.

3. The touch display panel according to claim 1, wherein:
   the orthographic projections of the n touch driving electrodes on the base substrate are rectangular, and four of the plurality of touch sensing electrodes surrounds each of the n touch driving electrodes.

4. The touch display panel according to claim 1, wherein:
   the at least one of the plurality of touch sensing electrodes serves as a touch sensing electrode corresponding to the adjacent two of the n touch driving electrodes.

5. The touch display panel according to claim 4, wherein:
   the integrated circuit sends the touch driving signals to the n touch driving electrodes one after another to perform the touch scan.

6. The touch display panel according to claim 1, wherein:
   the plurality of touch sensing electrodes is arranged in the row direction, and extends in the column direction; or
   the plurality of touch sensing electrodes is arranged in the column direction, and extends in the row direction.

7. The touch display panel according to claim 1, wherein:
   each of the plurality of touch sensing electrodes is strip-shaped, extending in one of the row direction and the column direction.

8. A touch display device, comprising:
   a touch display panel, including:
   a base substrate;
   n touch driving electrodes, electrically insulated from each other and arranged in an array on the base substrate;
   a plurality of touch sensing electrodes, insulated from each other and around each of the n touch driving electrodes, wherein the n touch driving electrodes are disposed in a same layer as the plurality of touch sensing electrodes, and each of the plurality of touch sensing electrodes is connected to an integrated circuit through a corresponding signal line, respectively;
   the integrated circuit, wherein the integrated circuit is configured to send touch driving signals to the n touch driving electrodes to form a three-dimensional electric field near a surface of the touch display panel and perform a touch scan, and to receive sensing signal change quantities of the plurality of touch sensing electrodes around a same one of the n touch driving electrodes, to determine three-dimensional coordinates of a touch position;
   first signal lines routing from a first side of the touch display panel, each of the first signal lines including a first section, a second section parallel to the first section, and a third section extending along the first side and connecting the first section and the second section, wherein each of the plurality of touch sensing electrodes is connected to the integrated circuit through a corresponding first signal line routing from the first side of the touch display panel; and second signal lines routing from a second side opposite to the first side of the touch display panel, each of the second signal lines including a first section, a second section parallel to the first section, and a third section extending along the second side and connecting the first section and the second section, wherein each of the plurality of touch driving electrodes is connected to the integrated circuit through a corresponding second signal line routing from the second side opposite to the first side of the touch display panel, and a projection of the first signal lines on the base substrate has no overlap with a projection of the second signal lines on the base substrate, wherein:
  the touch display panel includes a row direction and a column direction, intersecting each other,
  the first sections of some of the first signal lines are located between adjacent touch sensing electrodes, and the first sections of some of the second signal lines are located between adjacent touch sensing electrodes,
  the n touch (hiving electrodes and the plurality of touch sensing electrodes are electrically connected to the integrated circuit,
  each of the plurality of touch sensing electrodes is electrically insulated from each other and connected to the integrated circuit, respectively, and
  two of the plurality of touch sensing electrodes corresponding to two adjacent touch driving electrodes arranged in the row direction are located between the two adjacent touch driving electrodes arranged in the row direction, and two of the plurality of touch sensing electrodes corresponding to two adjacent touch driving electrodes arranged in the column direction are located between the two adjacent touch driving electrodes arranged in the column direction.

9. A touch detection method for a touch display panel, wherein the touch display panel, includes a base substrate; n touch driving electrodes, electrically insulated from each other and arranged in an array on the base substrate; a plurality of touch sensing electrodes, insulated from each other and around each of the n touch driving electrodes, wherein the n touch driving electrodes are disposed in a same layer as the plurality of touch sensing electrodes, and each of the plurality of touch sensing electrodes is connected to an integrated circuit through a corresponding signal line, respectively; the integrated circuit, wherein the integrated circuit is configured to send touch driving signals to the n touch driving electrodes to form a three-dimensional electric field near a surface of the touch display panel and perform a touch scan, and to receive sensing signal change quantities of the plurality of touch sensing electrodes around a same one of the n touch driving electrodes, to determine three-dimensional coordinates of a touch position; first signal lines routing from a first side of the touch display panel, each of the first signal lines including a first section, a second section parallel to the first section, and a third section extending along the first side and connecting the first section and the second section, wherein each of the plurality of touch sensing electrodes is connected to the integrated circuit through a corresponding first signal line routing from the first side of the touch display panel; and second signal lines routing from a second side opposite to the first side of the touch display panel, each of the second signal lines including a first section, a second section parallel to the first section, and a third section extending along the second side and connecting the first section and the second section, wherein each of the plurality of touch driving electrodes is connected to the integrated circuit through a corresponding second signal line routing from the second side opposite to the first side of the touch display panel, and a projection of the first signal lines on the base substrate has no overlap with a projection of the second signal lines on the base substrate, wherein: the touch display panel includes a row direction and a column direction, intersecting each other, the first sections of some of the first signal lines are located between adjacent touch sensing electrodes, and the first sections of some of the second signal lines are located between adjacent touch sensing electrodes, the n touch driving electrodes and the plurality of touch sensing electrodes are electrically connected to the integrated circuit, each of the plurality of touch sensing electrodes is electrically insulated from each other and connected to the integrated circuit, respectively, and two of the plurality of touch sensing electrodes corresponding to two adjacent touch driving electrodes arranged in the row direction are located between the two adjacent touch driving electrodes arranged in the row direction, and two of the plurality of touch sensing electrodes corresponding to two adjacent touch driving electrodes arranged in the column direction are located between the two adjacent touch driving electrodes arranged in the column direction, the method comprising:
  a working time of the touch display panel being within one frame period, the integrated circuit is configured to send touch driving signals to the n touch driving electrodes to form a three-dimensional electric field near a surface of the touch display panel and perform a touch scan.

10. The method according to claim 9, wherein:
the integrated circuit determines the touch position according to two touch sensing electrodes that receive greatest sensing signal change quantities among the sensing signal change quantities received by the plurality of touch sensing electrodes.

11. The method according to claim 9, wherein:
the integrated circuit sends the touch driving signals to the ouch driving electrodes one after another to perform the touch scan.

12. The method according to claim 9, wherein:
in response to zero touch action, the integrated circuit sends the touch driving signals to selected touch driving electrodes of the n touch driving electrodes, wherein adjacent touch driving electrodes of the selected touch driving electrodes are separated by at least one touch driving electrode, to which no touch driving signals are sent, of the n touch driving electrodes.

13. The touch display panel according to claim 1, wherein:
each of the n touch driving electrodes is surrounded by a corresponding touch sensing electrode group and a corresponding strip-shaped touch sensing electrode.

* * * * *